United States Patent Office 3,039,917
Patented June 19, 1962

3,039,917
DISINFECTING AND CLEANSING METHOD
Adolf Schmitz, 15 Baumbluete, and Guenter Cramer, 172 Alfredstrasse, both of Essen, Germany
No Drawing. Filed Aug. 6, 1957, Ser. No. 676,493
1 Claim. (Cl. 167—22)

This invention generally relates to disinfecting and cleansing compounds and more particularly it pertains to aqueous solutions of these compounds in which the active disinfecting agent comprises a water-soluble acid salt of a high molecular weight amino acid and more specifically a water-soluble acid salt of a compound having the general formula:

$$C_{12}H_{25}-NHCH_2CH_2CH_2NH-C_xH_{2x}COOH$$

wherein $x$ represents 1, 2 or 3.

Accordingly, $C_xH_{2x}$ is intended to cover the groups consisting of $-CH_2-$; $-CH_2CH_2-$;

$$-\underset{\underset{CH_3}{|}}{C}H-;\ \text{and}\ -\underset{\underset{CH_3}{|}}{C}HCH_2-$$

It is therefore an object of this invention to provide novel compositions and solutions which can be used for disinfecting and cleansing purposes. Other objects of the invention will appear hereinafter.

The compounds as set forth in the present invention are absolutely new and they possess unexpected properties and technical advantages as compared with the compounds known in the prior art.

The above compounds can be most easily prepared by reacting 1-3, propylenediamine with $C_{12}H_{25}Cl$ and the resulting monoalkylated propylenediamine carboxylated with either the appropriate chlorofatty acid (e.g. chloroacetic, chloropropionic, etc.) or by the appropriate unsaturated acid (crotonic, acrylic etc.), thus resulting in a final product of the above general formula.

Alternatively the compounds of this invention may be produced by reacting dodecylamine with acrylonitrile and after hydrogenation the reaction product may then be carboxylated by reaction with either the appropriate chlorofatty acid (e.g. chloroacetic, chloropropionic, etc.) or an appropriate unsaturated acid (crotonic, acrylic, etc.) thus resulting in a final product having the above general formula.

In order to further illustrate this invention, but without intending to limit it thereto, the following specific examples are provided: (all temperatures are in degrees centigrade).

Example 1

Five moles of propylenediamine $$(NH_2CH_2CH_2CH_2NH_2)$$

were heated together with one mole of dodecylchloride ($C_{12}H_{25}Cl$) to 140° for several hours. From the reaction product (by means of fractional distillation) the monododecylpropylenediamine $$(C_{12}H_{25}-NHCH_2CH_2CH_2NH_2)$$

boiling between 180–210° at 19 mm. Hg, was separated from the simultaneously formed dialkylated propylenediamine. The yield amounted to about 70%.

The thus obtained monododecylpropylenediamine was reacted at 100° in aqueous solution with sodium-chloroacetate in the mol ratio of 1:1 to form the amino-acid—

$$C_{12}H_{25}-NHCH_2CH_2CH_2NH-CH_2COOH$$

From this product a 10% aqueous solution was prepared and this solution was brought to a pH-value of 6 with tartaric acid whereby a salt of the amino acid with tartaric acid is formed. In this form the product can be used for disinfection, e.g. of hands.

Example 2

One mole of dodecylamine ($C_{12}H_{25}NH_2$) was heated under stirring to between 60 and 70° and was reacted within 20 minutes with one mole of acrylonitrile $$(CH_2=CH.CN)$$

The product was hydrogenated in the presence of Raney-nickel as catalyst and ammonia at 130°–140° at 150 atmospheres of hydrogen pressure for 2 hours to produce dodecylpropylenediamine $$(C_{12}H_{25}-NHCH_2CH_2CH_2NH_2)$$

After removing the catalyst by means of filtration the raw product was subject to fractional distillation under reduced pressure. The monododecylpropylenediamine was obtained as a main fraction at 175–205°/11 mm. Hg.

By the addition of crotonic acid to monododecylpropylenediamine in the mol ratio of 1:1 a salt was obtained. This salt was condensed to form the amino acid under continuous stirring conditions at 100° for 12 hours and the amino acid had the formula:

$$C_{12}H_{25}-NHCH_2CH_2CH_2NH-\underset{\underset{CH_3}{|}}{C}HCH_2COOH$$

A 10% aqueous solution of this condensation product adjusted to a pH-value of about 5.5 with the addition of hydrochloric acid. The final product can be used for the disinfection of animate or inanimate objects.

Example 3

Within 1 hour one mole of methylacrylate was added to one mole of monododecylpropylenediamine as per Example 1 or 2 while the temperature was rising to 70–80°. The reaction mixture was further heated to 100° for three hours. Then one mole of sodium hydroxide was added as a 20% aqueous solution. The mixture was further heated for 1 hour. From the resulting mixture there was produced a 10% aqueous solution which was adjusted to a pH-value of about 6.0 by means of hydrochloric acid. The final solution can be applied for the disinfection of animate and inanimate surfaces.

Example 4

One mole of monododecylpropylenediamine was reacted at 100° in an aqueous solution with the sodium salt of 2-chloropropionic acid in the mole ratio of 1:1. After 1 hour a clear aqueous solution was obtained which was diluted to 10% and was then adjusted to a pH-value of about 5.5 by means of acetic acid.

The resulting solution can be used as disinfectant on both living and inanimate surfaces.

All materials produced according to the procedures of Examples 1–4, were tested and found to have both bacteria-destroying (e.g. *Staphylococcus aureus*) and cleansing properties. They are preferably prepared and used in the form of their aqueous solutions (1–50% and preferably 10–20%), the pH of which is adjusted to about 4–6. Preferably they are not combined with fats or oils or soaps, as the presence of these compounds sometimes tends to reduce their disinfecting action.

The novel compounds of this invention could conceivably be mixed with inactive carrying materials such as urea, sodium sulphate, talcum or the like and by that means could be converted into powder or moldable pieces.

It is to be understood that the foregoing detailed description is given merely by way of illustration and that many variations may be made without departing from the spirit and scope of the invention as defined by the appended claim.

What is claimed is:
A method for cleansing and disinfecting animate and inanimate objects which comprises applying thereto a composition which comprises 50–99% by weight of water and 1–50% by weight of a water-soluble acid salt of a compound having the general formula:

$$C_{12}H_{25}-NHCH_2CH_2CH_2NH-C_xH_{2x}-COOH$$

wherein the expression $C_xH_{2x}$ represents combinations of hydrogen and carbon selected from the group consisting of $-CH_2-$; $-CH_2CH_2-$;

$$-\underset{\underset{CH_3}{|}}{CH}-; \text{ and } -\underset{\underset{CH_3}{|}}{CHCH_2}-$$

References Cited in the file of this patent

UNITED STATES PATENTS

| | | |
|---|---|---|
| 2,684,946 | Schmitz | July 27, 1954 |
| 2,840,600 | Du Brow et al. | June 24, 1958 |

FOREIGN PATENTS

| | | |
|---|---|---|
| 792,962 | France | Nov. 7, 1935 |
| 460,372 | Great Britain | Jan. 26, 1937 |